UNITED STATES PATENT OFFICE.

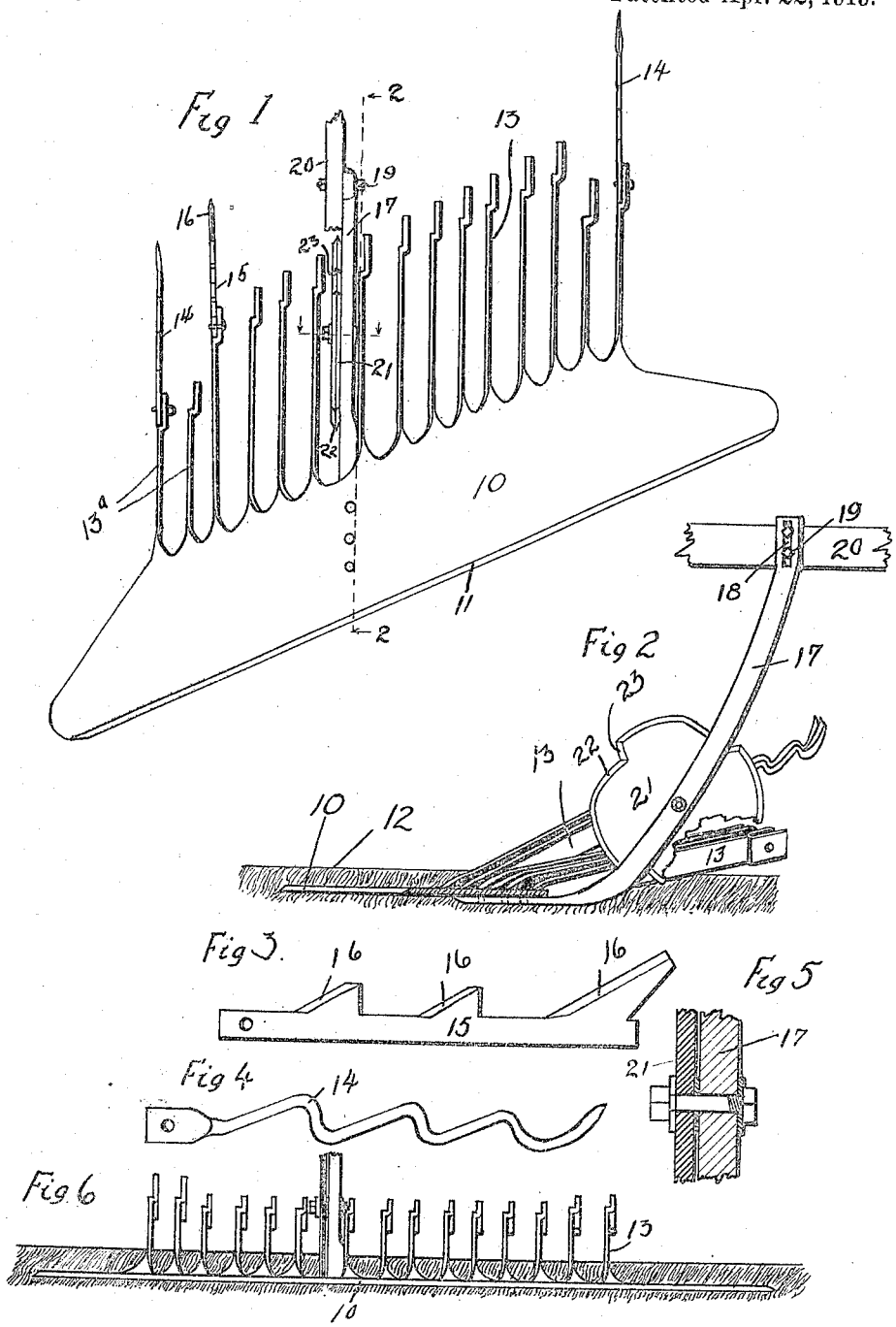

EARL STEWART, OF DES MOINES, IOWA.

CULTIVATOR ATTACHMENT.

1,301,520.
Specification of Letters Patent.
Patented Apr. 22, 1919.

Application filed October 14, 1918. Serial No. 258,074.

*To all whom it may concern:*

Be it known that I, EARL STEWART, a citizen of the United States, and a resident of Des Moines, in the county of Polk and State of Iowa, have invented a certain new and useful Cultivator Attachment, of which the following is a specification.

The object of my invention is to provide a cultivating tool of simple and inexpensive construction, adapted to be mounted on any ordinary cultivator frame.

More particularly it is my object to provide a blade adapted to travel on the ground on a diagonal line for cutting just under the surface of the ground for certain kinds of cultivation, particularly in dry form.

Extending upwardly and rearwardly from the blade are a plurality of arms, parts of the arms at the end having a crimped wire extension on them for carrying over weeds and vines and the like, while the remaining arms having a cutter blade of peculiar form.

The blade has a long supporting arm on which is rotatably mounted a cutting wheel having notches so arranged as to cut weeds, vines and the like with a shearing cut.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows top or plan view of the cultivating tool embodying my invention.

Fig. 2 shows a side elevation of the same, parts being broken away.

Fig. 3 shows a detail, sectional view of one of the cutter devices on the arms.

Fig. 4 shows a side elevation of one of the crimped wire members for raising the corn and shaking the dirt out from the weeds.

Fig. 5 shows a vertical, sectional view through the axle of the cutter wheel; and Fig. 6 shows a front elevation of the device.

In Figs. 1 and 6 part of the cutter blades on the arms are omitted.

In the accompanying drawings, I have used the reference numeral 10 to indicate generally a broad flat blade having the sharp edge 11, which is designed to travel on a diagonal line just underneath the surface of the ground 12, as illustrated in Fig. 2.

At the rear edge of the blade 10 is a plurality of upwardly and rearwardly extending arms 13. The two outer arms on one blade on the side designed to be next to the corn or the like, are extended upwardly at a sharper angle and higher than the other arms, as indicated at 13$^a$.

Secured to the arms 13$^a$ and extending upwardly and rearwardly are crimped wires 14 having wave form.

Secured to the rear ends of the arms 13 are upwardly and rearwardly extending cutter bars 15 having spaced upwardly extending cutting edges 16.

Secured to the central portion of the blade 10 is a supporting arm 17, which extends upwardly and rearwardly and has at its upper end an elongated slot 18 through which are extended bolts 19 by which the supporting arm is secured to an arm 20 of a cultivator.

Rotatably mounted on the frame 17 is a cutting wheel 21 having a plurality of notches 22, one edge of each notched portion being sharpened as at 23, so that the sharp edge 23 of each notch will cut weeds, or especially morning glories with a shearing motion with respect to the arm 17.

The edges 23 are arranged almost radially of the cutting wheel.

In the practical use of my improved cultivating tool, the blade 10 travels under the surface of the ground making a shallow cut, and cutting off the weeds with a shaving or shearing movement. The weeds then travel upwardly and rearwardly from the arms 13 and 13$^a$.

The plants to be cultivated, such as corn, will be raised by the arms 13$^a$ and the wires 14 and will be shaken as they travel over the ground 13 for dislodging any dirt, so that the plants will thereafter extend upright.

The weeds travel upwardly from the arms 13, and thence over the cutter bars 15 and are cut to pieces on the edges 16, and are also shaken as they travel from the edges 16 for freeing them from dirt, so that when they drop on the ground they will be exposed to the sun and will dry.

Some changes may be made in the construction and arrangement of the parts of my improved device without departing from the essential features and purposes of my invention, and it is my intention to cover by this application, any modified forms of structure or use of mechanical equivalent which may be reasonably included within the scope of my claims.

I claim as my invention:

1. A cultivating tool comprising a flat blade having a plurality of upwardly and rearwardly extending arms, bars secured to the rearward ends of said arms having spaced upwardly extending cutter blades upwardly and rearwardly extending arms at the ends of said cutter blades extending upwardly at a sharper angle to and higher than said first described arms, crimped wire extending upwardly from said last described arms, for raising and shaking out plants undergoing cultivation.

2. A cultivating tool comprising a flat blade having a plurality of upwardly and rearwardly extending arms, bars secured to the rearward ends of said arms having spaced upwardly extending cutter blades, upwardly and rearwardly extending arms at the ends of said cutter blades extending upwardly at a sharper angle to and higher than said first described arms, crimped wire extending upwardly from said last described arms, for raising and shaking out plants undergoing cultivation, and a supporting arm on said first blade, a cutter wheel on said supporting arm having a plurality of notches each formed with one sharp edge arranged substantially rotatably on the wheel and adapted to cut weeds or the like with a shearing movement with relation to said arm.

3. A cultivating tool comprising a flat blade having a plurality of upwardly and rearwardly extending arms, bars secured to the rearward ends of said arms having spaced upwardly extending cutter blades, and a supporting arm on said first blade a cutter wheel on said supporting arm having a plurality of notches each formed with one sharp edge arranged substantially radially of the wheel and adapted to cut weeds or the like with a shearing movement with relation to said arm.

Des Moines, Iowa, July 13, 1918.

EARL STEWART.

Copies of this patent may be obtained for five cents each, by addressing the "Commissioner of Patents, Washington, D. C."